May 28, 1940.  J. D. NIXON  2,202,462
MEANS FOR INTERMITTENTLY CONTROLLING THE FLOW OF FLUIDS
Original Filed March 27, 1937  7 Sheets—Sheet 1

Inventor
Jeddy D. Nixon

May 28, 1940.  J. D. NIXON  2,202,462
MEANS FOR INTERMITTENTLY CONTROLLING THE FLOW OF FLUIDS
Original Filed March 27, 1937    7 Sheets-Sheet 2
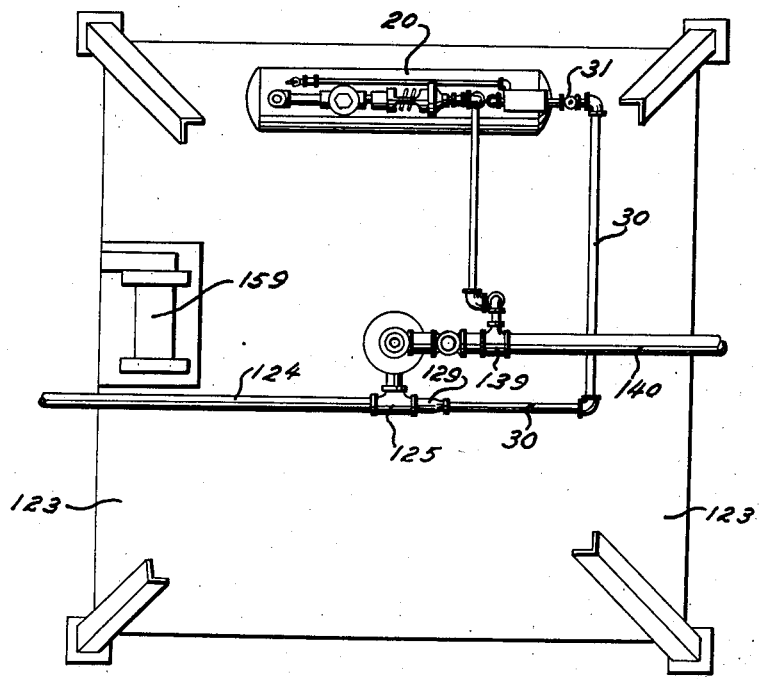
Fig. 2
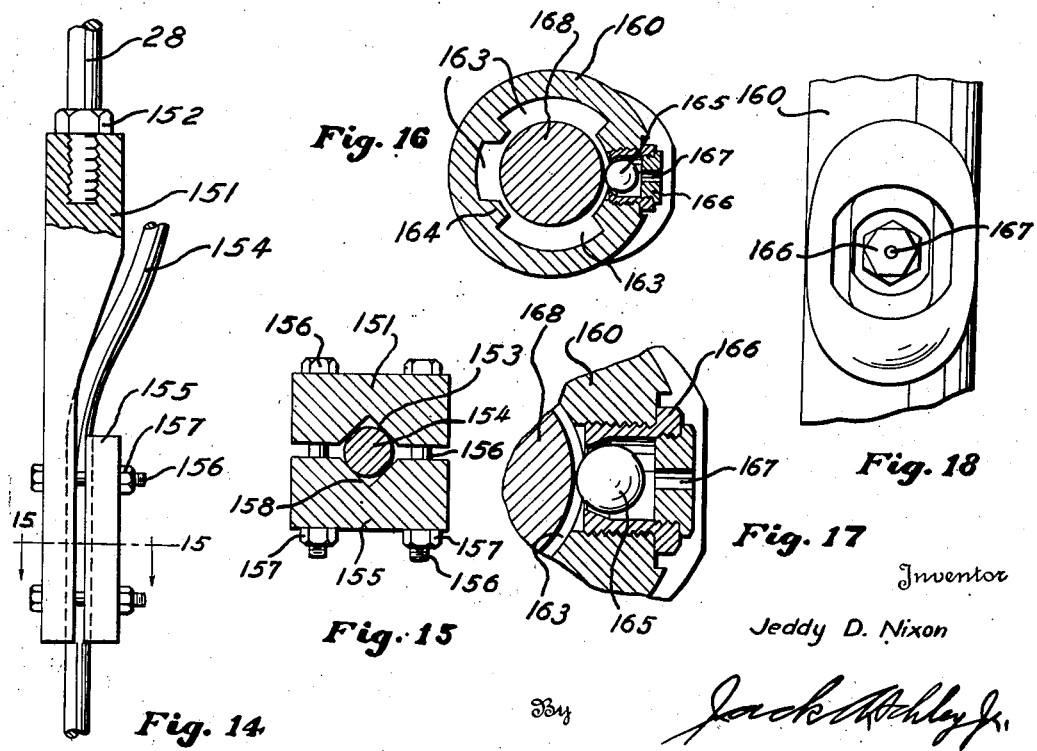
Inventor
Jeddy D. Nixon
By Jack Ashley Jr.
Attorney May 28, 1940. J. D. NIXON 2,202,462
MEANS FOR INTERMITTENTLY CONTROLLING THE FLOW OF FLUIDS
Original Filed March 27, 1937 7 Sheets-Sheet 3
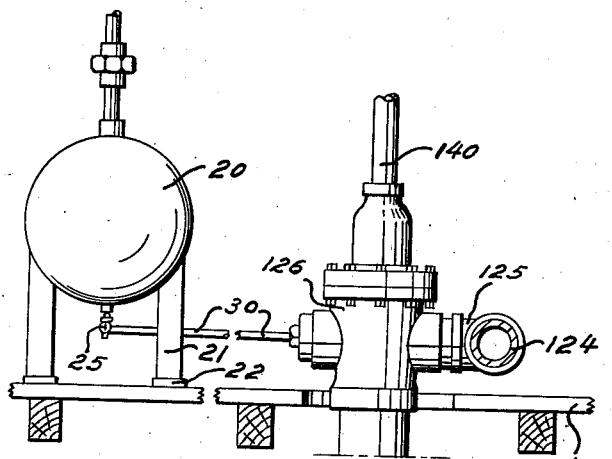
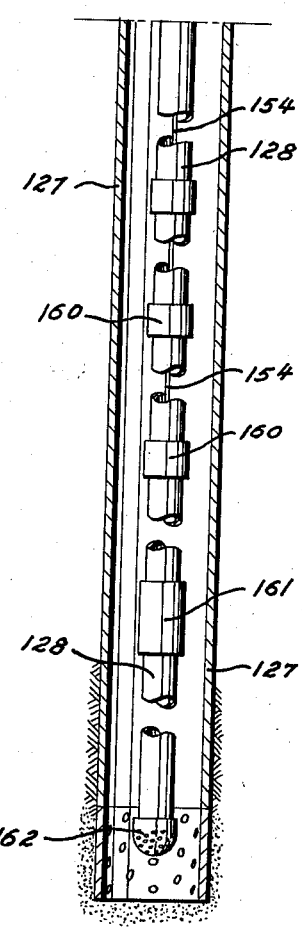
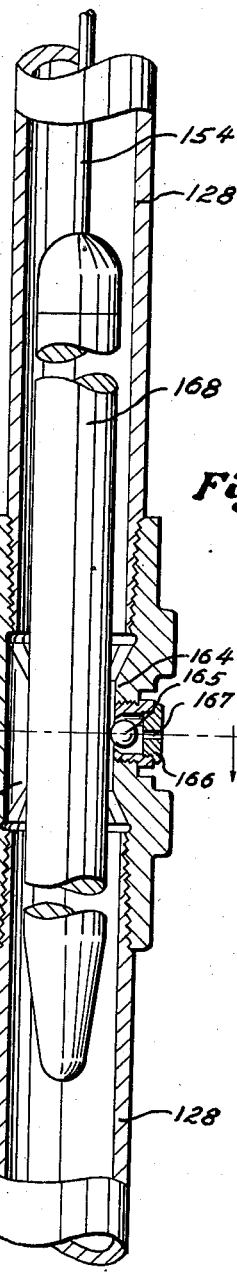
Fig. 3
Fig. 4
Inventor
Jeddy D. Nixon
By Jack Ashley Jr.
Attorney

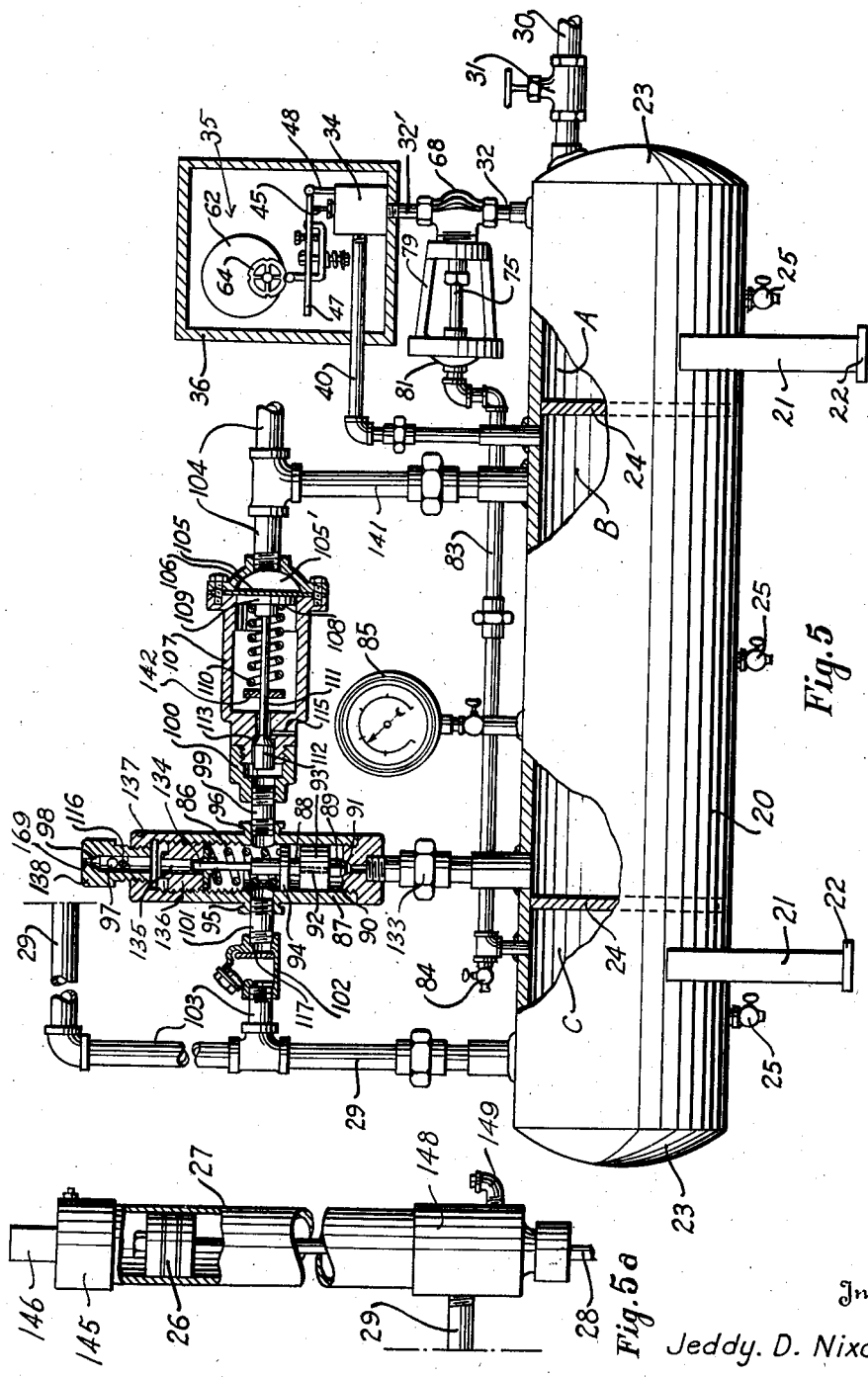

May 28, 1940.　　　　J. D. NIXON　　　　2,202,462
MEANS FOR INTERMITTENTLY CONTROLLING THE FLOW OF FLUIDS
Original Filed March 27, 1937　　7 Sheets-Sheet 5
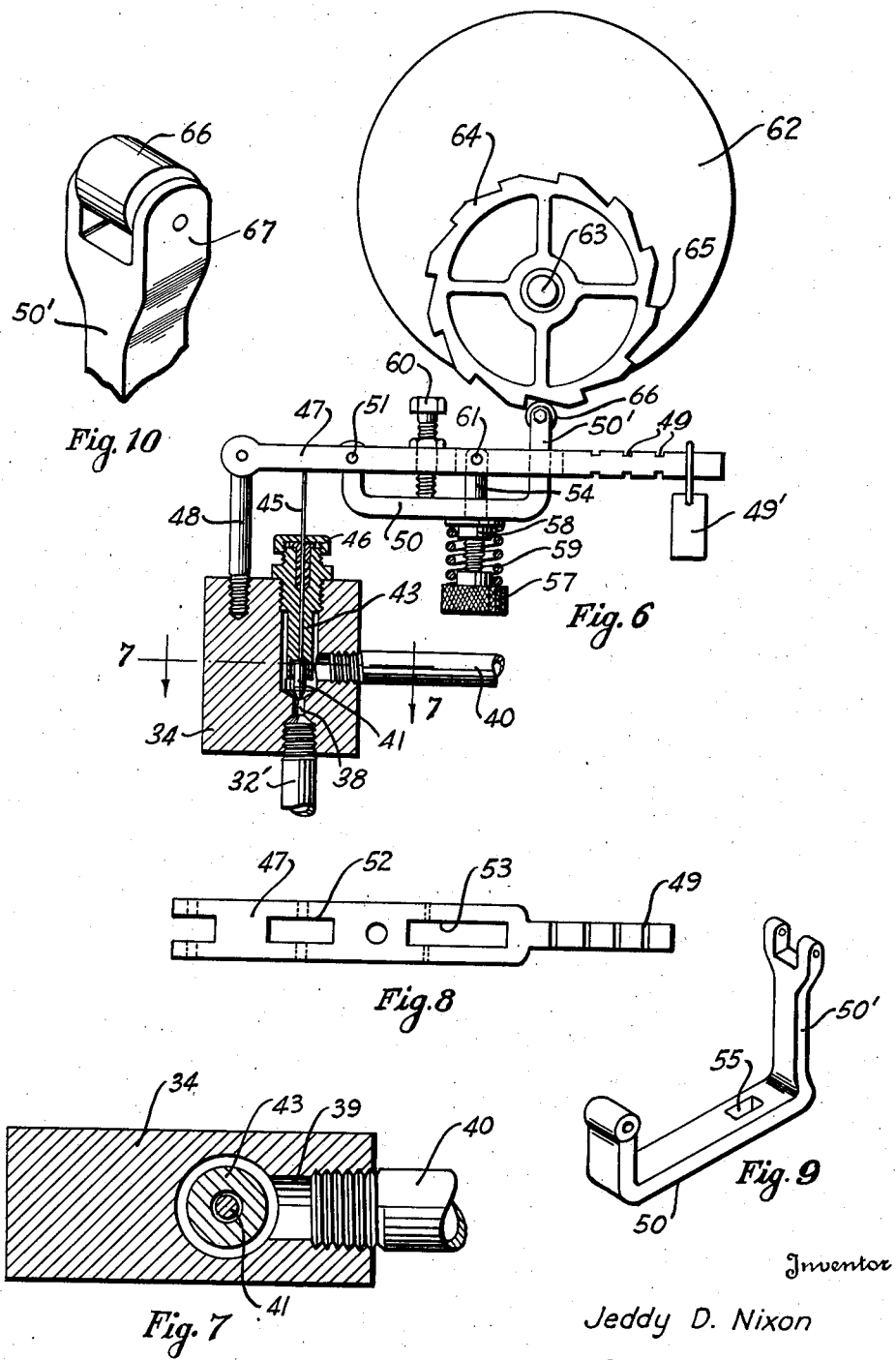
Inventor
Jeddy D. Nixon
By Jack Achley Jr.
Attorney May 28, 1940. J. D. NIXON 2,202,462
MEANS FOR INTERMITTENTLY CONTROLLING THE FLOW OF FLUIDS
Original Filed March 27, 1937 7 Sheets-Sheet 6

Inventor
Jeddy D. Nixon
By Jack Ackley Jr.
Attorney

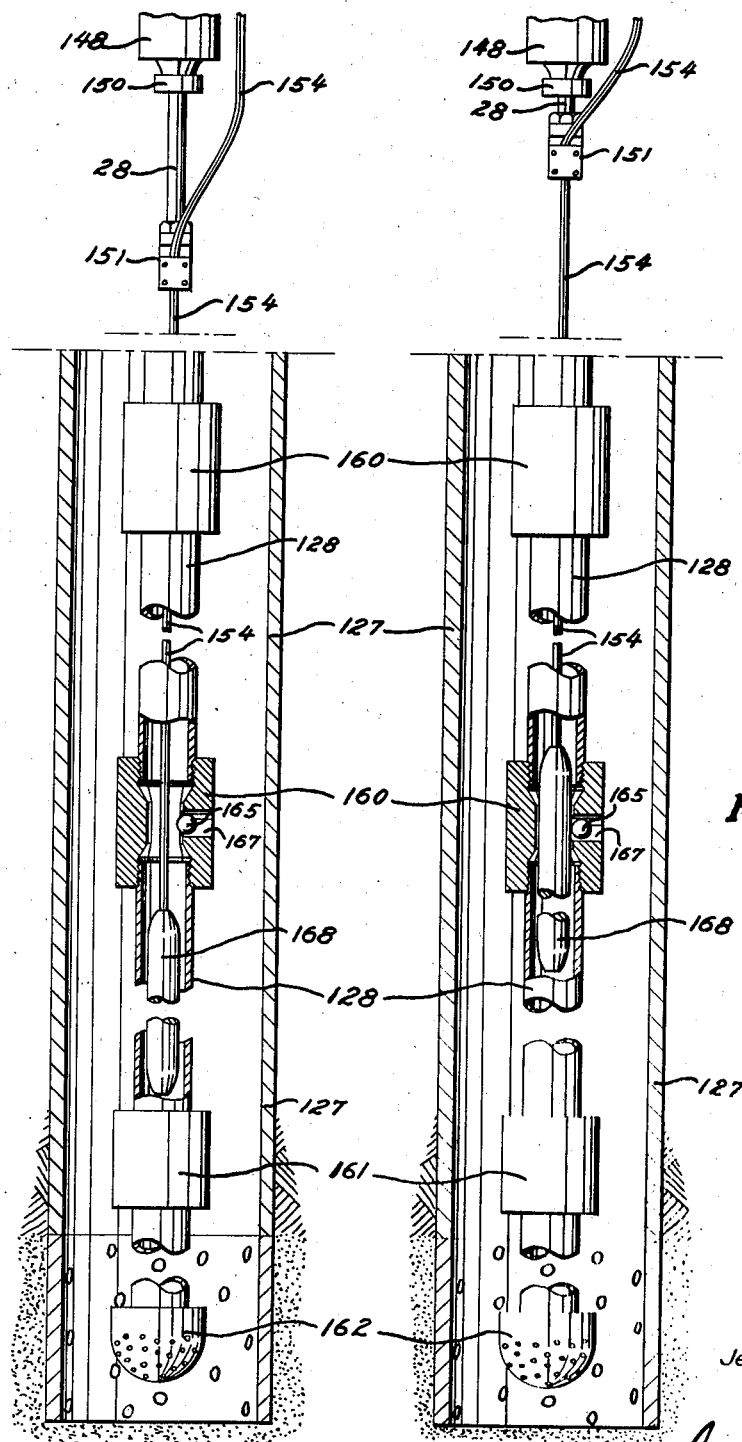

Patented May 28, 1940

2,202,462

UNITED STATES PATENT OFFICE 2,202,462

MEANS FOR INTERMITTENTLY CONTROLLING THE FLOW OF FLUIDS

Jeddy D. Nixon, Houston, Tex., assignor of one-half to Wilson Supply Company, Houston, Tex., a corporation of Texas Substitute for abandoned application Serial No. 133,312, March 27, 1937. This application November 7, 1938, Serial No. 239,348

25 Claims. (Cl. 103—232)

This invention relates to new and useful improvements in means for intermittently controlling the flow of fluids.

This application is filed as an improvement on my copending application, filed February 1, 1937, Serial No. 123,444, which has subsequently matured into Patent No. 2,132,081; and my co-pending application, Serial No. 241,040, filed November 17, 1938, which has subsequently matured into Patent No. 2,171,812; and also as a substitute for my abandoned application Serial No. 133,312, filed March 27, 1937.

One object of the invention is to provide an improved intermittent control device which is constructed to control the flow of a fluid, so that a predetermined quantity of said fluid may be produced, discharged, or controlled at designated or predetermined intervals. The functions of said control device are entirely mechanical and the operation thereof is substantially automatic.

An important object of the invention is to provide an improved intermittent control device which is arranged to automatically control the flow of a pressure fluid to an actuating device at predetermined, regular intervals, whereby the positive operation of said actuator at such intervals is assured without depending upon the natural flow or a built-up pressure of said pressure fluid to operate said actuator.

Another object of the invention is to provide an improved device of the character described, wherein the valve mechanism for controlling the flow of pressure fluid to the actuating device is operated by a time or clock mechanism, so that said valve is positively opened at regular time intervals.

A further object of the invention is to provide an improved intermittent control device, wherein a time or clock mechanism is employed to control the operation of the pressure fluid control valves, the construction being such that the valve is actually operated by the pressure of the fluid itself, rather than by the time or clock mechanism; and also the pressure fluid is never exerted against said time mechanism, whereby the efficiency of said mechanism is assured at all times.

Still another object of the invention is to provide an improved system of intermittent fluid control which consists in, a supply of pressure fluid, conducting a portion of the pressure fluid at predetermined time intervals to an actuator to operate the same, cutting off said flow as the conducted pressure fluid reaches a predetermined pressure sufficient to operate the actuator, and releasing the pressure fluid from the actuator.

Still another object of the invention is to provide an improved system of intermittent fluid control which consists in, a supply of pressure fluid, conducting a portion of the pressure fluid at predetermined time intervals to an actuator to operate the same, the actuator controlling the flow of a secondary fluid, the normal position of the actuator cutting off the flow of the secondary fluid, cutting off the flow of said pressure fluid as the conducted portion of said pressure fluid reaches a predetermined pressure sufficient to operate the actuator, the operation of the actuator permitting the secondary fluid to flow, and the flowing of the secondary fluid releasing the pressure fluid from the actuator to permit the same to return to its normal position.

Still another object of the invention is to provide an improved system of controlling a well which consists in, a supply of pressure fluid admitted into a well, a portion of the pressure fluid being bypassed to an intermittent control device, which at predetermined time intervals supplies said fluid to an actuator to operate the same, the actuator controlling the admission of pressure fluid to the well fluid in the well to lift said well fluid from said well, cutting off the flow of said pressure fluid as the bypassed portion of said fluid reaches a predetermined pressure sufficient to operate the actuator, and the flowing of the well fluid releasing the pressure fluid from the actuator to permit the same to return to its normal position.

A construction designed to carry out the invention will be hereinafter described, together with other features of the invention.

The invention will be more readily understood from a reading of the following specification and by reference to the accompanying drawings, in which an example of the invention is shown, and wherein:

Figure 2 is a plan view of the derrick floor;

Figure 3 is a diagrammatic view, illustrating how the invention may be connected to a well for operating the same;

Figure 4 is a longitudinal, sectional view through one of the valves, and showing the actuating weight suspended therein;

Figure 5 is a view, partly in elevation and partly in section, of part of the above ground structure of an intermittent control device;

Figure 6 is an enlarged view, partly in elevation and partly in section, showing the control mechanism for the inlet valve;

Figure 7 is a horizontal, cross-sectional view, taken on the line 7—7 of Figure 6;

Figure 8 is a plan view of the operating arm of the valve control mechanism;

Figure 9 is a perspective view of the crank of said mechanism;

Figure 10 is an enlarged, perspective view of the upper end of the crank arm and showing the roller mounted therein;

Figure 14 is a detail of the wire line clamp;

Figure 15 is a horizontal, cross-sectional view, taken on the line 15—15 of Figure 14;

Figure 16 is a horizontal, cross-sectional view, taken on the line 16—16 of Figure 4;

Figure 17 is an enlarged, detail view of the inlet port of the valve;

Figure 18 is an enlarged elevation of the valve, showing the inlet port thereof;

Figure 19 is a diagrammatic view, showing how the invention may be applied to a well and the flow valve in the well being closed; and Figure 20 is a similar view, showing how the flow valve is opened.

Figure 1:
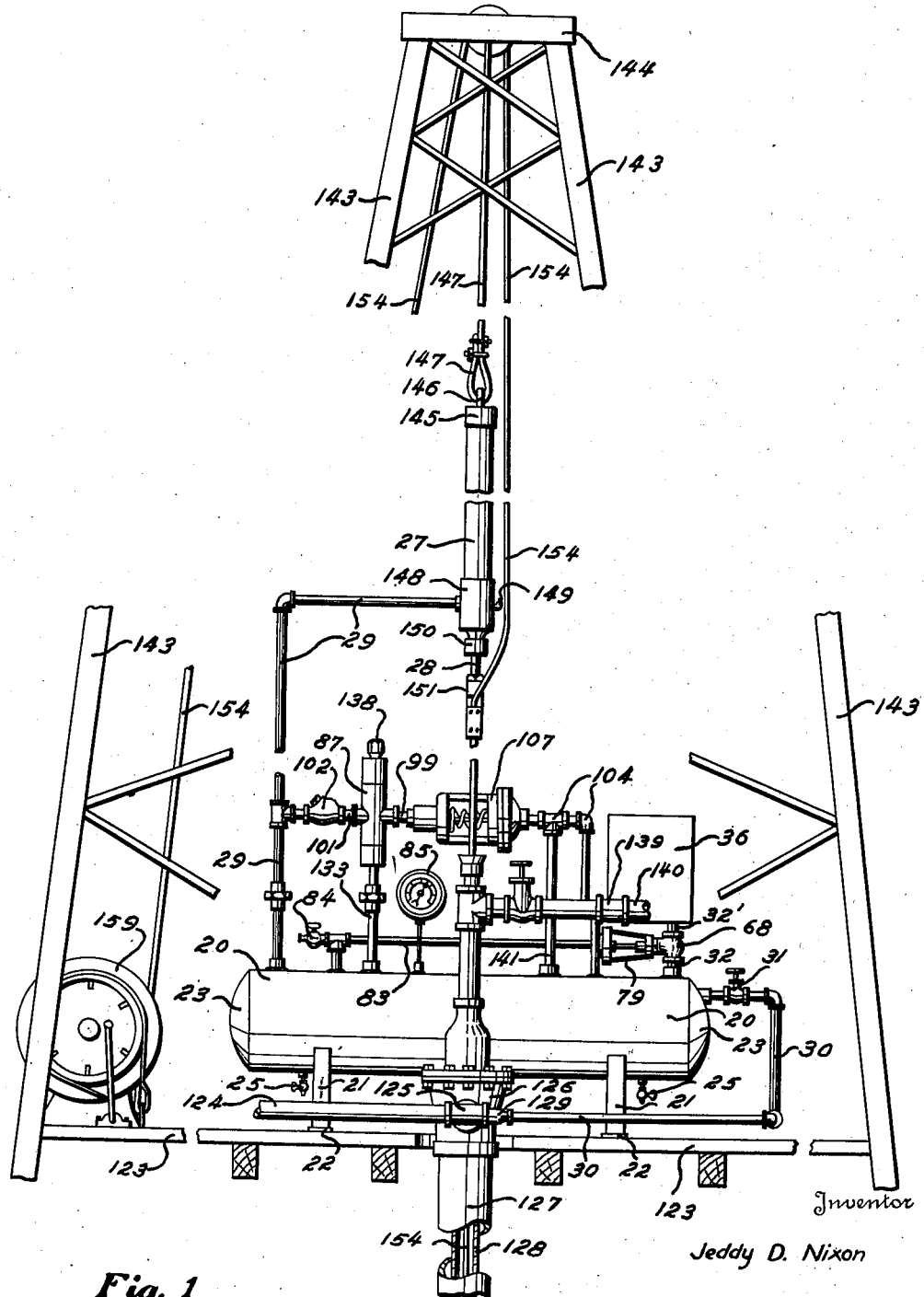
Figure 1 is an elevation of a device constructed in accordance with the invention, and shown as mounted on a well.

In the drawings, the numeral 20 designates a cylindrical, elongate tank mounted on standards 21, which standards have feet 22 that are adapted to rest upon a suitable support, such as a derrick floor 123 of a well. The ends of the tank 20 are closed by caps 23 and the interior of said tank is provided with transverse, vertical partitions 24 which divide the tank into chambers A, B and C. Each chamber has a suitable drain outlet or pet cock 25 connected in its bottom.

While the invention has numerous uses and is not to be limited to any particular one, it has been found very satisfactory as a control for fluid lifts, such as are used to elevate well fluids. As pointed out in my co-pending application Serial No. 241,040, filed November 17, 1938, which has subsequently matured into Patent No. 2,171,812; to explain the invention, it will be illustrated and described in connection with such a lift. These fluid lifts use a pressure fluid to raise the well fluid by both displacement and by lifting.

In the installation shown in the drawings, the pressure fluid is supplied from a suitable source (not shown), such as a compressor station or a gas well, to the well through a pipe 124 and a T 125. The pipe and T are connected to the usual casing head 126 mounted on the upper end of a well casing 127 and supporting the usual string of tubing 128. A swaged nipple 129 connects the T and a pipe 30, which pipe extends to the tank 20. As will be seen in Figures 1 and 2, the pipe 30 includes a suitable control valve 31 which is manually operated and said pipe is connected directly into the cap 23 that closes the open end of the chamber A.

Figure 11:
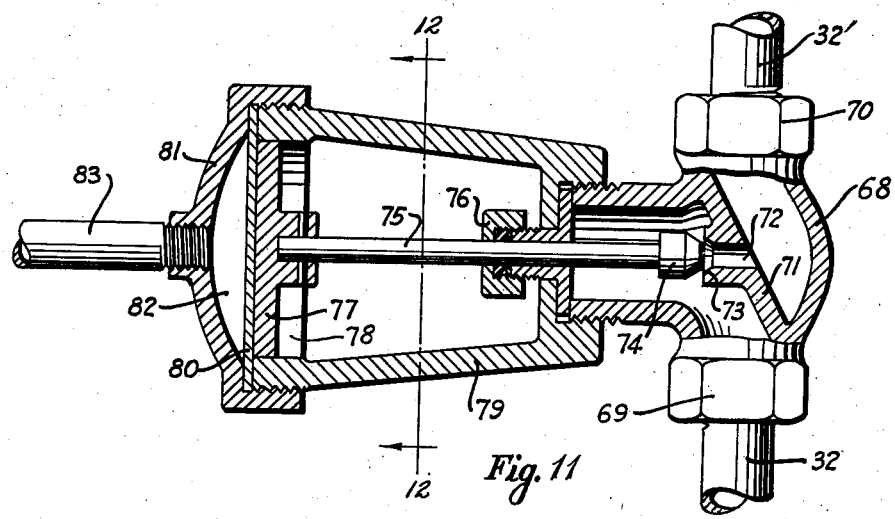
Figure 11 is a longitudinal, sectional view of the diaphram operated, cut-off valve.
Figure 12:
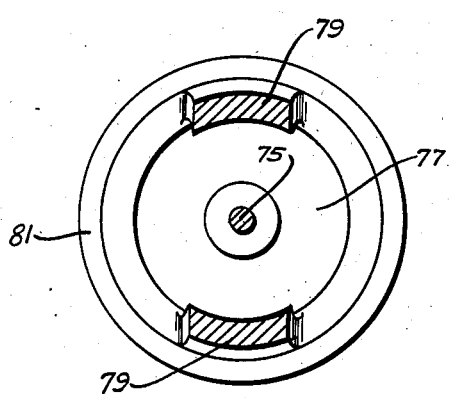
Figure 12 is a transverse, sectional view, taken on the line 12—12, of Figure 11.

The pressure fluid supplied to the tank by said pipe 30 may be the same as that supplied to the casing 127, or it may be an extraneous pressure fluid. At any rate, the chamber A will be filled with a pressure fluid at substantially the same pressure as is held in the pipe 124 and the casing 127. This chamber is provided with an outlet port to which is connected an upright pipe 32, the upper end of which leads into a diaphragm operated, cut-off valve body 68 (Figures 1, 5 and 11). This valve will be described in detail later in the specification. The valve body 68 is provided with an inlet port 69 on one end, into which is threaded the upper end of said pipe 32. Said valve body is also provided with an outlet port 70 on the other end into which is threaded a section of pipe 32', the upper end of which is screwed into a threaded opening 33 provided in a block 34 of a time operated mechanism or control device 35 (Figures 6 and and 13). The block and mechanism are mounted in a suitable casing or housing 36 above the chamber A on the tank 20.

Figure 13:
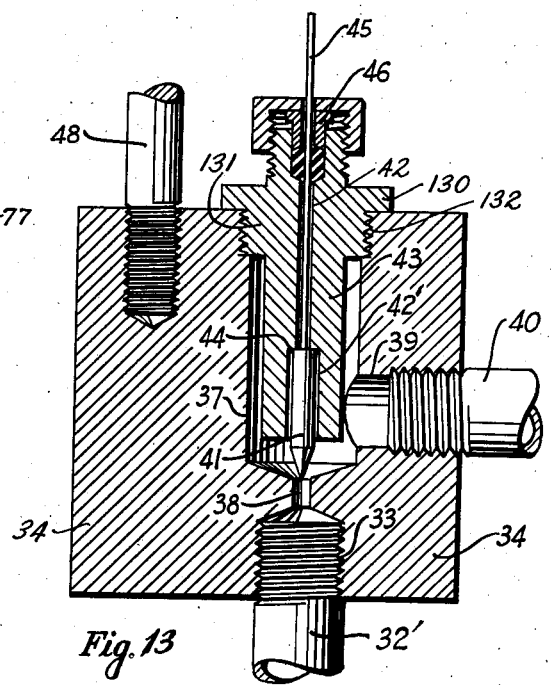
Figure 13 is an enlarged, sectional view, taken through the inlet valve and showing the details thereof.

The block 34 is disposed in the lower portion of the housing 36 and has a vertical bore 37 therein (Figure 13). This bore extends downward from the top of the block to a point above the opening 33 and communicates with said opening through a reduced port 38. A laterally directed opening 39 extends outwardly from the lower end of the bore 37 and has a pipe 40 connected therein. With this arrangement, the pressure fluid may flow from the chamber A, through the pipe 32, the valve body 68, the pipe 32', reduced port 38, into the bore 37, and from which it will flow into the opening 39 and the pipe 40.

An elongated support or plug 43 is suspended in the bore 37 of the block 34 and the diameter of the major portion of the plug is less than the diameter of said bore of said block, whereby an annular clearance or space is provided between the plug and the wall of the bore. The upper end of the plug is formed with an annular flange or head 130 for abutting or resting upon the upper end of said block and a screw threaded boss 131 beneath the head for engaging a screw threaded socket 132 at the upper end of the bore 37. The plug is formed with an axial bore 42 extending therethrough, the lower end of which is enlarged to form an elongated, cylindrical valve chamber or recess 42' and it will be seen (Figure 13), that an internal, annular shoulder 44 is formed between the bore 42 and the recess 42'. For controlling the flow of fluid from the pipe 32' through the block 34 to the pipe 40, a valve member 41 is provided and arranged to close the upper end of the port 38. This valve member is mounted to undergo a limited sliding movement in the recess 42' between the shoulder 44 and the upper end of the port 38. When the valve member is in its raised or opened position, the upper end thereof abuts the shoulder 44 and when said member is in its lower or closed position, the conical point thereof enters the port 38 and closes the same, so that all flow therethrough is prevented.

A thin valve rod or stem 45 extends downwardly through a stuffing box 46 on the upper end of the plug 43 and through the bore 42 thereof. The lower end of said valve stem 45 rests on the upper end of the valve member 41, but has no fixed connection therewith. Manifestly, when the valve stem is moved downwardly, its lower end engaging the upper end of said member 41, will move said member downwardly so that the conical point on its lower end enters the port 38 to close off the same. So long as the stem is in its lowermost position, it will hold the valve member in a seated position, which will positively prevent a flow of fluid from the pipe 32' through the bore 38 and 37 and into the pipe 40. When the pressure on the upper end of the valve stem is released or removed, the pressure of the fluid in the pipe 32' acting against the underside of said valve member will move said member and said valve stem upwardly in the recess 42' and the bore 42 of the plug 43. It is noted that the upward movement of the valve member 41 will be limited by the upper end of said member striking the shoulder 44 and as the upward movement ceases, the upward movement of the valve stem will also cease.

For controlling the operation of the stem 45 to control the seating and unseating of the valve member, said stem has its upper end contacting the underside of a lever 47, (Figure 6) but has no fixed connection therewith. This lever has one end pivoted to an upright post 48 which extends upwardly from the block 34 and the outer end of this lever may be provided with a plurality of suitable transverse grooves 49, in which a weight 49' may be placed, if necessary. In Figures 6 and 8, it will be seen that a number of these grooves may be provided for adjustment, so that the position of said weight may be varied in accordance with the operation conditions of the various installations, although in a majority of instances the weight 49' will not even be used.

Due to its pivotal mounting, the lever 47 tends to swing downwardly at all times and is supported only by the stem 45, whereby the weight of said lever is imposed upon said stem and said valve member 41 to hold the latter in its seated position. In order for the valve member to raise the lever 47, the pressure below the valve member must be sufficient to lift said lever and its attachments.

An operating crank or member 50, which is substantially a bellcrank lever, is connected to the lever 47. One arm of the crank 50 is pivoted on a pin 51 within an opening 52 in the lever 47, (Figures 6, 8 and 9) while the other arm 50' of said crank extends upwardly through a slot or opening 53 in said lever. A supporting or adjusting rod or bolt 54 has its upper end pivoted in one end of the slot 53 on a pin 61 and has its lower end depending through an opening 55 in the crank 50. The lower end of the rod 54 has a knurled nut 57 threaded thereon and said nut is provided with a reduced shank extending upwardly therefrom. A flanged collar 58 is slidable on said rod below the crank 50 and a coiled spring 59 is interposed between the collar and said nut, in order to exert its pressure to hold said collar against the underside of the crank 50 and to urge said crank and said arm 50' to swing upwardly on the pivot pin 51. The upward movement of the crank with relation to the lever 47 is limited by a set screw 60, which is threaded through said lever and has its lower end engaging said crank. It is pointed out that by adjusting the screw 60, the limit of the upward movement of said crank may be varied and by rotating the nut 57, the tension of the spring 59 against said crank may be regulated, whereby the rigidity of the connection between said lever and said crank may be controlled.

A suitable time or clock mechanism 62 is mounted in the housing 36 directly above the lever 47 and has a shaft 63 extending therefrom on which is mounted a suitable escapement wheel 64, that has notches 65 cut in its periphery. The wheel revolves in a counter-clockwise direction (Figure 6). The upper end of the arm 50' is slotted to form a bifurcated yoke 67, in which a small roller 66 is so mounted that it is free to revolve therein. It will be seen in Figures 5 and 6, that the roller 66 rides on the periphery of the wheel 64, so that when said wheel has revolved and a notch 65 comes over said roller, the same is free to enter said notch, as will be described later.

The chamber A of the tank 20 will contain approximately the same pressure fluid as the supply line 30 and inasmuch as the pipe 32, 32' is connected to this chamber, the lower end of the valve member 41 will have this same pressure bearing thereon, as long as the valve body 68 is open. This pressure is sufficient to overcome the weight of the valve member 41, the valve stem 45, the lever 47, the crank 50, all attachments to said lever and crank and a weight 49, if used. The set screw 60 and nut 57 are adjusted, so that the roller 66 will prevent the upward movement of the valve member 41, when riding on the periphery of the wheel 64 between the notches 65. Thus, it will be seen that when a notch registers with the roller 66, the latter is then free to move upwards which permits the pressure under the valve member 41 to lift said member, valve stem 45, lever 47, crank 50, arm 20' and roller 66, thereby opening the port 38 so that pressure fluid may pass therethrough and enter the pipe 40. It is pointed out that any number of notches may be cut in the periphery of said wheel to control the opening of the port 38 at any desired predetermined time intervals.

The valve member will be lifted until its upper end strikes the shoulder 44, at which point no further impetus on the stem 45, lever 47 and the other mechanism will be had. It is pointed out that the pressure of the fluid in the pipe 32, 32' will not be further exerted on the lever and its suspended mechanism, nor will this pressure be exerted on the wheel 64 or clock mechanism (not shown). However, the roller 66 being under the tension of the spring 59 will engage and ride the inclines of the notches 65, and therefore it is pointed out that by adjusting the set screw 60 and the tension of the spring 59, by the rotation of the nut 57; the arm 50' and said roller may be raised or lowered so as to properly contact the periphery of the wheel 64, whereby said roller may readily move into one of the notches whenever the two register. In Figure 6, it will be noticed that one of the inclines of each notch is substantially perpendicular and as the wheel revolves in a counterclockwise direction, the steeper incline is first presented to the roller so that said roller will enter the notches very quickly and this permits the valve member 41 also to open quickly, whereby the pressure fluid may readily flow from the chamber A through pipe 32, valve body 68, pipe 32' and pipe 40 into the chamber B.

The chamber B is provided with a suitable pressure gauge 85, so as to readily indicate the pressure therein, as well as the fluctuations of such pressure. A short length of upright pipe 133 is also connected to said chamber, while the upper end of this pipe is threaded into the lower end of a cylindrical, upright, operating or control valve case 87 (Figures 1 and 5). This case 87 has a cylindrical valve mandrel 88 slidable axially therein and said mandrel being formed with a depending stud or pin 89, having a frustro-conical tip 90 on its lower end. The upper end of the inlet port at the lower end of said case 87 is preferably countersunk so as to form a tapered, annular seat 91, whereby the tip 90 may engage said seat and close this inlet port. Above the pin 89, an annular guide head or collar 93 is fastened on the mandrel 88 and is provided with a plurality of ducts or ports 92 extending therethrough (Figure 5). The guide head 93 has a snug sliding fit within said valve case 87, which causes any fluid admitted from the pipe 133 to flow through the ports 92. A circular valve or shut-off disk 94 is fastened on the mandrel above said guide head and this disk also has a snug sliding fit within said valve case.

This case 87 is provided with a pair of outlet ports 95 and 96, intermediate its ends and preferably diametrically opposite each other. It will be seen that the disk 94 closes or shuts off the lower end of said case below said outlet ports and prevents the escape or passage of any fluid. It is particularly pointed out that said disk acts or serves as an equalizing valve, because the area of the under surface of said disk is so much greater than the lower end of the frustro-conical tip 90. When said disk is raised above the lower edge of the outlet ports 95 and 96, so as to permit the passage of the pressure fluid, the passage of said pressure fluid lifts said disk to a full open position and holds it there. It is pointed out that said disk will remain in this open position for a sufficient length of time to permit the pipes 99, 101, 103 and 29, the chamber C, pipe 83 extending from said chamber to the cap 81 of the cut-off valve 68, and the cylinder 27 below the piston 26, to fill to substantially the same pressure as that above and around said disk, so as to move said plunger to its upper position (Figure 5a) with a slow and smooth action, at which time the pressure of fluid above and around said disk and that below the tip 90 will become substantially equalized. When the pressure above and below said disk has become sufficiently equalized and substantially no more pressure fluid will flow from beneath said disk, due to the filling of said pipes, chamber and cylinder, then and only then will said disk move downwardly and close off the lower portion of said valve case 87.

The valve mandrel 88 is enlarged just above the disk 94 and is then reduced to provide an upstanding, axial guide stem 134, which slidably engages within the axial bore 135 of a bushing 136. The bushing is screwed into the upper end of the bore of said valve case and projects thereabove, so that an annular, elongated cap or head 137 may be screwed onto the upper portion of the bushing 136. It will be seen in Figure 5 that by removing the cap 137, said bushing may be adjusted vertically in the bore of said valve case.

A coil spring 86 is mounted between the bushing 136 and the disk 94 and surrounds the guide stem 134 and valve mandrel 88. Thus, it is pointed out that if said bushing is screwed further down into said valve case, the compression of the spring 86 is increased and all of the slidable valve parts therebelow are held in their lowermost positions, (Figure 5) with increased force; and if said bushing were screwed upwardly in said valve case, the compression of said spring would be lessened, with a resultant reducing of the force exerted on said movable valve parts. The tension of said spring 86 controls the amount of pressure required in the chamber B in order to open the tip 90 and disk 94, as well as to hold said tip and disk in a closed position until sufficient pressure is built up in the chamber B to overcome the tension of said spring.

The upper end of the cap 137 is provided with an axial, screw-threaded opening into which is threaded a hexagonal, elongated cage 138, having an axial bore extending therethrough and counter-bored at its upper end to form a seat 98. A ball valve 97 is mounted within the bore of the cage 138 for engaging the seat 98 to close said bore. A pin 116 is inserted across the bore of the cage, so as to limit the downward movement of the ball. It is pointed out that said ball is of such size and so restricts the bore of said cage, that when suddenly subjected to a high fluid pressure, it will be lifted or carried up to the seat 98 and held there. This will close said bore and keep the same closed whereby the leakage or escape of the pressure fluid from said case 87 to the atmosphere is prevented. However, there is sufficient clearance between the ball and the wall of the bore of said cage 138 to permit the passage of fluid around the ball, so that when the pressure and velocity of said fluid has been materially reduced, said ball 97 will fall and rest upon the pin 116, thereby permitting the escape of said pressure fluid to the atmosphere.

The outlet ports 95 and 96 of the valve case 87 are internally screw-threaded, so that a short length of pipe 99 may be threaded into the port 96 and a short length of pipe 101 threaded into the port 95. The pipe 99 leads to a chamber 100 on one end of a diaphragm operated, relief valve 107 (Figure 5) and the other end of this valve is connected to a pipe 104, which extends to a T 139 connected in a well fluid flow line 140. The pipe 104 is supported by an upright standard 141 mounted on the drum 20 and is threaded into a concavo-convex cap or head 105 on one end of the valve cage 107. This cap confines a diaphragm 106 between said cap and the end of said cage, thus forming a chamber 105' on one side of the diaphragm. On the opposite side of said diaphragm, a circular piston 109 mounted on a piston or valve rod 111 works within a cylinder 108. A suitable coil spring 110 surrounds said valve rod and at one end bears against the piston 109; and on the other end said spring bears against a retainer plate 142. This plate is suitably connected to several of the bolts (not shown), which are longer than the other bolts holding said cap on the cylinder 108. These bolts (not shown) are preferably screw-threaded throughout their length, so that the plate 142 may be easily adjusted thereon.

Thus, it will be seen that with this arrangement, the compression of said spring may be regulated so as to compensate for variances in the pressure of the well fluid in the pipes 140 and 104. By regulating the compression on said spring, the piston may be actuated whenever desired; such as when only a portion of a charge of well fluid has passed the T 139; or when the major portion of a charge has passed said T; or if the well fluid has to be carried a long distance which builds up a back pressure in the pipes 104 and 140, the spring is adjusted so that the piston 109 will not be actuated, until the pressure fluid introduced into the casing 127 and the tubing 128 has lifted all of a charge of well fluid and begins building up a pressure in the T 139 and pipe 104 much greater than the above-mentioned back pressure. It is pointed out that this spring 110 may be readily adjusted to handle the necessary pressures exerted on the diaphram 106 and piston 109 from the pipe 104, in accordance with the various well conditions encountered.

The other end of the valve rod 111 is provided with a cylindrical head or boss 112 formed with an inclined valve face 113 on one end for engaging a complementary seat in the chamber 100, in order to open and close an exhaust port 115. The head 112 is provided with a plurality of longitudinal channels (not shown which serve as passageways and said head protrudes into said chamber 100 in the end of the valve cage 107 adjacent the pipe 99. When said head 112 and valve face 113 are in their open position, the chamber 100 is open to the atmosphere through the exhaust port 115, so as to exhaust any fluid in the pipes 99 and 101, the valve cage 87 above the disk 94, the valve cage 138, and said chamber 100.

The pipe 101 is connected to a check valve 102 which has the usual flap pivotally mounted therein. This flap is provided with a small hole or bleed opening 117 extending therethrough, so that a small amount of fluid may escape therethrough when said flap is in its closed position. The other end of the check valve is connected to a short horizontal pipe 103 that leads to an upright pipe 29. The lower end of this pipe 29 is connected to the chamber C of the tank 20 for supplying pressure fluid to said chamber, which serves as a pressure cushion. The upper end of the pipe 29 is connected to a tubular housing or cylinder 27 (Figures 1 and 5a). This cylinder is suitably suspended over the well, either in the usual drilling derrick 143 from the crown block 144 at the upper end of said derrick, or in a stub derrick made for this purpose, or in any other desired support. The upper end of said cylinder is closed by a vented cap 145 having an upright ear 146 formed thereon, through which a loop of a cable 147 depending from the crown block 144 of the derrick 143, or other suitable support, is inserted. A piston or actuator 26 having the usual piston rings or cups thereon works within the cylinder 27 and is mounted on a piston rod 28 extending axially of said cylinder and out of the lower end thereof. The lower end of said cylinder is provided with an elongated cap 148 having a suitable lubricant chamber (not shown) therein for containing any lubricant, such as lubricating oil, and a filler pipe 149 is connected to said cap 148 for said lubricant chamber. Of course, a suitable stuffing box 150 is mounted on the lower end of said cylinder and surrounds the piston rod 28 to prevent the escape of said lubricant.

The lower end of said piston rod is screwed into the upper end of an enlongated wire line clamp 151 (Figures 1 and 14) and fastened therein by a lock nut 152. The lower portion of the clamp 151 is cut back, as is shown in Figure 14, and provided with an axial groove 153 (Figure 15); so that one side of a wire line, cable, or other element 154 may be imbedded in said groove. A clamping member 155 is fastened onto the lower end of said clamp by bolts 156 and nuts 157, as will be seen in Figures 14 and 15, and said member 155 has a complementary groove 158, whereby the opposite side of said wire line 154 may be imbedded therein. When the member 155 is fastened to the clamp 151, said wire line 154 will be securely clamped therein and any movement thereof will be transmitted to said wire line. Whenever pressure fluid is admitted to the cylinder 27 through the pipe 29, the piston 26 will be elevated therein and said piston rod 28 will carry said clamp 151 and wire line 154 therewith, whereby any device attached to said wire line will be likewise lifted. In Figure 1, it will be seen that the slack end of said wire line extends up over the sheaves of the crown block 144 on the upper end of the derrick 143 and then down to a suitable drum or hoist 159, as is the usual practice. It is preferred that the cylinder 27 is suspended co-axially with the tubing 128 of the well, thus assuring a vertical alinement.

In Figures 5 and 11, it will be seen that the valve body 68 is connected in the pipe 32, 32'. This valve body is provided with an inlet port 69, into which is connected the upper end of the pipe 32, and an outlet port 70, into which is connected the lower end of the pipe 32'. Said valve body is provided internally with an inclined partition 71 extending across said body between the inlet and outlet ports. This partition is formed with a central, horizontal opening or port 72 which has an annular, inclined seat 73. A valve 74 within said body is provided with a tapered face for co-acting with the seat 73 and is secured on one end of a valve stem 75 for opening and closing the port 72 in said partition. The valve stem 75 is surrounded by a suitable stuffing box 76, so as to prevent the escape of fluid from said valve body around said stem. The other end of said valve stem is fastened to a flat, circular disk or piston 77, which is slidably mounted in a shallow cylinder 78 on one end of a valve cage 79. The piston 77 bears against one side of a diaphragm 80, that is confined on one end of said valve cage 79 by a concavo-convex cap or head 81, and thereby forming a chamber 82 on the other side of said diaphragm (Figure 11). A short length of pipe 83 is threaded into said cap 81 on one end and extends along the upper side of said tank 20 and has its other end connected into the chamber C. A drain or petcock 84 may be provided in said line, if desired.

As has been stated, the invention has been very successful in connection with the operation of a fluid lift for wells, but the invention is not to be limited to this particular use. In order to explain the invention and how it may be used with a fluid lift, I have illustrated a particular valve structure and a fluid lift, as set forth in the aforementioned patent and co-pending patent applications. The casing 127 extends down into the well, as is the usual practice, and a string of tubing 128 is mounted within said casing (Figures 1, 3, 19 and 20). This string of tubing contains a plurality of flow valves 160, (Figures 3, 4, 16, 17, 18, 19 and 20) which are spaced in accordance with the conditions and circumstances surrounding the well. If desired, a suitable choke nipple 161, or any other regular flow equipment may be mounted in the tubing string, and on the lower end of said tubing it is desirable to connect a perforated bull plug 162. The flow valves 160 are shown as formed of elongated collars having an internal, cylindrical chamber 163 with a number of inwardly directed, guide ribs 164 extending thereinto, and having their upper and lower ends beveled. A ball valve 165 is confined in a case 166 screwed into the side of said valve 160. The case 166 has a fluid inlet port 167, whereby fluid may enter said tubing from said casing, so that the fluid level in said tubing will be above the ball valve 165 and will be the same as that in said casing.

Whenever the pressure fluid in said casing encounters said valve, said ball valve will be seated and thus close off said tubing from said casing. It will be seen (Figures 4, 16, 17, 19 and 20) that when the ball 165 is seated, a portion thereof will protrude into the axial bore of said valve 160. A tripping weight 168 is fastened on the lower end of the wire line 154 and has its lower end pointed, so that it will more readily descend in said tubing and enter the valves 160. The upper end of this weight is reduced, in order that said weight may readily enter the valve upon the upward travel thereof. When said weight is lowered or raised into said valve, the guide ribs 164 will center said weight in the bore of said valve and this weight is of such diameter as to engage the ball valve 165 and force the same from its seat in the cage 166 (Figure 17). In this position, communication is established between said casing and said tubing, so that the pressure fluid in said casing 127 may flow into said tubing 128. When said weight 168 is lifted, or lowered out of said valve 160, the ball valve 165 will be released by said weight and the flow of the pressure fluid through said cage 166 will seat said ball valve and hold it closed, whereby the elevation of fluid in said tubing from this point is terminated.

In operation, the fluid level of the well, on which a fluid lift and the intermittent control device are to be installed, is ascertained and the tubing string 128 is lowered into said well. In accordance with the fluid level and the other well conditions, the bull plug 162, or a screen (not shown) of the desired length is screwed onto the lower end of said tubing string, the choke nipple 161 is then connected in said tubing and said tubing string made up in the usual manner. The desired or necessary number of flow valves 160 are inserted in said tubing string, in accordance with the conditions of said well. After said tubing is made up and suspended within said casing 127, the weight bar 168 on the end of the wire line 154 is lowered into said tubing. The movement of the wire line, at this time, is controlled by the hoist 159. This weight bar may be lowered into the uppermost flow valve, or whichever one it is desired to operate.

This uppermost valve is usually set below the standing level of the well fluid and when said weight bar is suspended in said valve, (Figure 4) said ball valve 165 will be held off of its seat in the cage 166 (Figures 16 and 17). The pressure fluid introduced into the upper end of said casing 127, through the casing head 126, from the T 125 and pipe 124, will be above the standing level of said well fluid in said casing. The pressure fluid will force said well fluid through the opened valve cage 166 around said ball valve and into said tubing. As the level of said well fluid in said casing recedes, due to the forcing of said well fluid into said tubing, the level or column of well fluid in said tubing rises. When the level of said well fluid in said casing reaches the opened valve cage 166, the pressure fluid will enter said tubing around said ball valve 165 and lift the well fluid in said tubing above said valve, cutting off the column of well fluid at this point and lifting this charge of well fluid up and out of said tubing through the flow line 140 to a separator, (not shown) or other suitable disposal. If only one flow valve 160 is used, then said weight bar 168 is lowered out of said valve to a position, as shown in Figure 19 which is a short distance below said valve, and the wire line clamp 151 is fastened around said wire line 154, so as to securely hold the same. The intermittent control device is now ready for actuation. However, if it is desired or necessary to use more than one flow valve and the well has to be produced from a lower level, then the weight bar may be lowered to the next valve, where the same operation occurs that has been set out above for the uppermost valve. When the desired level and valve is reached, the wire line is attached as has been described and the use of said hoist 159 is discontinued.

Pressure fluid is supplied to the pipe 30 from the T 125 and pipe 124 and is lead by said pipe through the valve 31 which has now been opened, into the chamber A of the tank 20, so that said chamber will be filled with approximately the same pressure as contained in the pipes 30 and 124 (Figures 1 and 2). This pressure fluid will also enter the pipe 32, the port 69 and valve body 68 (Figures 5 and 11). The valve 74 is normally in its open position and the pressure fluid is free to pass from the chamber A and pipe 32, through the valve body 68 and pipe 32', and into the port 38 of said valve block 34. When the time mechanism (not shown) has revolved the wheel 64, so that one of the notches 65 is above the roller 66, the pressure under the valve member 41 is sufficient to then lift said member, the valve stem 45, the lever 47, crank 50, crank arm 50' and said roller upwardly, whereby said roller may enter said notch. With the valve member 41 in this raised position, the pressure fluid is free to pass from the port 38 and pipe 32', through the port 39 and into the pipe 40 and chamber B of said tank 20. The gauge 85 connected to said chamber B will show the amount of pressure being built up in said chamber.

The notches 65 on the wheel 64 are spaced so that at designated intervals, the pressure within the chamber B will be built up to a predetermined degree which is sufficient to overcome the tension of the spring 86 in the valve case 87. When the pressure of the fluid in the chamber B reaches this predetermined degree, the frustro-conical tip 90 will be raised from the inclined seat 91 and permit the pressure fluid to flow from the chamber B into said valve case 87. This pressure fluid will pass through the openings 92 in the guide head 93 and as soon as the disk 94 rises above the outlet ports 95 and 96, said pressure fluid will immediately fill said valve case 87 and will close the upper end thereof, by raising the ball valve 97 and holding it against the seat 98. Said pressure fluid will also enter the pipe 99 and the chamber 100, as well as the pipe 101, the check valve 102, the pipe 103 and the pipe 29. The valve 112 is normally seated which closes the duct 115. Said pressure fluid will flow down the pipe 29 into the chamber C and also up said pipe into the cylinder 27 beneath the piston 26. The chamber C serves as a cushioning chamber, so as to prevent the full force of said pressure fluid from entering said cylinder 27 and moving said piston 26 upwardly too suddenly.

Also, the pressure fluid in the chamber C will enter the pipe 83 and flow therethrough into the chamber 82 on one side of the diaphragm 80. This, of course, actuates the piston 77 and piston rod 75, which closes the valve 74 against its seat 73 in the partition 71. It is pointed out that the passage of pressure fluid through the valve body 68 from the port 69 and pipe 32, to the port 70 and pipe 32' is terminated. The valve member 41 will fall onto the upper end of the port 38 and closing the same, due to the natural laws of gravity and that the flow of pressure fluid therethrough has ceased. The lever 47, valve stem 45, the crank 50, and crank arm 50' are now free to drop. The roller 66 also will drop partially out of the notch 65 and as the revolving of the wheel 64 continues, due to the time mechanism 62 (not shown), said roller 66 rides up the incline of said notch onto the periphery of said wheel 64 between said notches. It is particularly pointed out that the closing of valve 68 prevents the full force of said pressure fluid from being exerted against the wheel 64, when said roller 66 is riding up the incline out of said notch 65, whereby said time mechanism does not have to operate against the pressure of said pressure fluid and the efficiency thereof is not impaired. It will be seen that when said roller is riding the periphery of said wheel between said notches, the crank 50 will place the spring 59 under a slight degree of tension which is sufficient to hold the lever 47 and valve stem 45 in their lowermost position. This will also hold the valve member 41 onto the upper end of the port 38, so that should any pressure fluid leak through the valve body 68, said valve member will not be lifted thereby.

It is particularly pointed out that with the arrangement shown in the drawings, the piston 26 will be moved upwardly smoothly and gradually and the rod 28 will be moved therewith. As has already been pointed out, said rod may be connected to any suitable device desired and when said rod is raised, said device may be actuated, or the operation thereof may be discontinued, depending entirely on the device and how it is connected to said rod. Inasmuch as applicant has shown the invention used with a well fluid lift, the lower end of said rod is connected to the wire line 154 by means of the wire line clamp 151 thereon (Figure 19). Upon upward movement of said rod 28 and piston 26, the weight bar 168 on the lower end of said wire line will be lifted or raised into the flow valve 160. It is pointed out that said bar was positioned a short distance below said flow valve before said wire line was clamped to said rod 28.

As has been pointed out, when said weight bar is in said flow valve (Figures 4, 16, 17, and 20), the valve cage 166 therein is open and the pressure fluid in said casing 127 will enter said flow valve and cut off the column of well fluid in said tubing 128 and said valve. The pressure fluid entering said valve will lift this cut off charge or "slug" of well fluid up and out of said tubing and into the flow line 140. The lifted charge of well fluid flowing through the flow line 140 will also pass through the T 139 into the pipe 104 and chamber 105' formed by the cap 105 of the relief valve 107. The fluid will distort the diaphragm 106 and move the piston 108 in the cylinder 109, which slides the piston rod 111 (Figure 5) to the left and the valve 112 off of its seat 113 permitting the longitudinal channels (not shown) of said valve to open the chamber 100 to the atmosphere through the port 115. As soon as this chamber is opened, said chamber, the pipe 99, the valve body 87 and the pipe 101 will be emptied of pressure fluid and the check valve 102 securely closed. The ball 97 will drop down onto the pin 116, as shown in Figure 5, and the pressure fluid in the cylinder 27, pipe 29, chamber C, pipe 83 and pipe 103 will begin to bleed through the small opening 117 in the pivoted flap of said check valve. It is particularly pointed out that the pop valve 138 serves an additional purpose to that described, which is as a leak valve between operating periods. Any pressure fluid escaping from the chamber B into the valve case 87 past the tip 90 and disk 94 will escape through the valve cage 138 instead of filling the chamber C, pipe 29 and cylinder 27 and thereby lifting the piston 26. Thus, this valve cage 138 will prevent the weight bar 168 from being pulled up into the flow valve 160 and prematurely actuating the flow lift.

After the passage of the charge of well fluid in the flow line 140, the chamber 105' will be drained or at least the pressure therein reduced, so that said diaphragm 106 and piston 109 may return to their original positions (Figure 5) and close the valve 112. As the pressure fluid in the cylinder 27, chamber C, pipe 83, chamber 82 of the cut off valve 68 and pipes 29 and 103 escapes through the port 169 of the cage 138 on the upper end of the valve case 87; the piston 26 and the rod 28 are lowered, as well as the wire line 154 and the weight bar 168. Thus, said weight bar is again lowered out of said flow valve 160 to the position shown in Figure 19, which closes said valve and prevents the entrance of additional pressure fluid from said casing 127 until said valve is again opened. The valve 68 is now open and pressure fluid is free to pass from the pipe 32 to pipe 32', although the valve member 41 is held onto its seat on the upper end of the port 38 by the roller 66 riding the periphery of the wheel 64 between the notches 65. The device is now ready for another operation and as soon as the time mechanism 62 (not shown) has revolved the wheel 64 sufficiently, so that another notch 65 has come over the roller 66, the above operation of said intermitter will be repeated.

It is pointed out that said well or other suitable source of fluid may thus be intermittently operated or produced. However, this well or source may be constantly operated or produced by shutting off the pressure fluid from the control device at any time desired.

What I claim and desire to secure by Letters Patent is:

1. An intermittent control device for controlling the flow of a secondary fluid including, a conduit for the secondary fluid being controlled, a pressure fluid supply inlet, a pressure fluid reservoir for supplying pressure fluid, a pressure fluid accumulating chamber, a conductor connecting said reservoir with said chamber for conducting the pressure fluid from said inlet to said chamber, a metering device for controlling the flow of pressure fluid through said conductor, a cylinder having an air vent and an inlet opening therein, a pressure fluid operated plunger slidable within said cylinder and operated by the pressure fluid from said accumulating chamber, means in said conduit for admitting pressure fluid into said conduit, a control member connected to and operated by said plunger for controlling said pressure fluid admitting means to control the flow of said secondary fluid, a valve connected with said accumulating chamber and said cylinder for controlling the supply of pressure fluid to said cylinder through said inlet opening, said valve being so arranged as to be actuated by a predetermined pressure of fluid within said chamber, means for controlling the operation of said valve and thereby the plunger operation, a cut-off valve for controlling the supply of pressure fluid from said reservoir to said metering device, and a release valve connected with said controlling valve and said conduit and having a diaphragm exposed to the secondary fluid and arranged to be operated by the pressure of said secondary fluid to release said pressure fluid from said control valve and said cylinder.

2. An intermittent control device for controlling the flow of a secondary fluid including, a conduit for the secondary fluid being controlled, a pressure fluid supply inlet, a pressure fluid reservoir for supplying pressure fluid, a pressure fluid accumulating chamber, a conductor connecting said reservoir with said chamber for conducting the pressure fluid from said inlet to said chamber, a metering valve for controlling the flow of pressure fluid through said conductor, a cylinder having an air vent and an inlet opening therein, a pressure fluid operated plunger slidable within said cylinder and operated by the pressure fluid from said accumulating chamber, means in said conduit for admitting pressure fluid into said conduit, a control member connected to and operated by said plunger for controlling said pressure fluid admitting means to control the flow of said secondary fluid, a valve connected with said accumulating chamber and said cylinder for controlling the supply of pressure fluid to said cylinder through said inlet opening, said valve being so arranged as to be actuated by a predetermined pressure of fluid within said chamber, means for controlling the operation of said valve and thereby the plunger operation, a cut-off valve for controlling the supply of pressure fluid from said reservoir to said metering valve, said cut-off valve being actuated by the pressure fluid released from said accumulating chamber by said control valve connected to said chamber, whereby the supply of pressure fluid to said metering valve is cut off in advance of the closing of said metering valve, and a release valve connected with said controlling valve and said conduit and having a diaphragm exposed to the secondary fluid and arranged to be operated by the pressure of said secondary fluid to release said pressure fluid from said control valve and said cylinder.

3. In an intermittent control device, the combination of a pressure fluid actuated servo-motor therefor, means for supplying a pressure fluid to said motor, a cut-off valve for interrupting the supply of pressure fluid, a time controlled valve in the pressure fluid supply means between the cut-off valve and the servo-motor, automatically-operated means for actuating the time-controlled valve at intervals of time, means connected with the cut-off valve for applying the pressure of the pressure fluid thereto to close said cut-off valve after said pressure fluid has been supplied to the servo-motor for a period of time and prior to the closing of the time-controlled valve, and fluid pressure operated means for releasing the pressure fluid from the servo-motor.

4. An intermittent control device for controlling the flow of a secondary fluid including, a conduit for the secondary fluid being controlled, a pressure fluid supply inlet, a pressure fluid reservoir for supplying pressure fluid, a pressure fluid accumulating chamber, a conductor connecting said reservoir with said chamber for conducting the pressure fluid from said inlet to said chamber, a metering device for controlling the flow of pressure fluid through said conductor, a cylinder having an air vent and an inlet opening therein, a pressure fluid operated plunger slidable within said cylinder and operated by the pressure fluid from said accumulating chamber, means in said conduit for admitting pressure fluid into said conduit, a control member connected to and operated by said plunger for controlling said pressure fluid admitting means to control the flow of said secondary fluid, a valve connected with said accumulating chamber and said cylinder for controlling the supply of pressure fluid to said cylinder through said inlet opening, said valve being so arranged as to be actuated by a predetermined pressure of fluid within said chamber, means for controlling the operation of said valve and thereby the plunger operation, a fluid cushioning chamber connected with said control valve and said cylinder to cushion the flow of pressure fluid to said cylinder, whereby the operation of said plunger is smooth and relatively slow, a check valve having a small bleed opening therein and connected to said control valve between said valve and said cushioning chamber and cylinder, a cut-off valve operated by pressure fluid from said cushioning chamber for controlling the supply of pressure fluid from said reservoir to said metering device, and a release valve connected with said controlling valve and said conduit and having a diaphragm exposed to the secondary fluid and arranged to be operated by the pressure of said secondary fluid to release said pressure fluid from said control valve and said cylinder.

5. An intermittent control device for controlling the flow of a secondary fluid including, a conduit for the secondary fluid being controlled, a pressure fluid supply inlet, a pressure fluid reservoir for supplying pressure fluid, a pressure fluid accumulating chamber, a conductor connecting said reservoir with said chamber for conducting the pressure fluid from said inlet to said chamber, a metering device for controlling the flow of pressure fluid through said conductor, a cylinder having an air vent and an inlet opening therein, a pressure fluid operated plunger slidable within said cylinder and operated by the pressure fluid from said accumulating chamber, means in said conduit for admitting pressure fluid into said conduit, a control member connected to and operated by said plunger for controlling said pressure fluid admitting means to control the flow of said secondary fluid, a valve connected with said accumulating chamber and said cylinder for controlling the supply of pressure fluid to said cylinder through said inlet opening, said valve being so arranged as to be actuated by a predetermined pressure of fluid within said chamber, a fluid cushioning chamber connected with said control valve and said cylinder to cushion the flow of pressure fluid to said cylinder, whereby the operation of said plunger is smooth and relatively slow, a cut-off valve operated by pressure fluid from said cushioning chamber for controlling the supply of pressure fluid from said reservoir to said metering device, and a release valve connected with said controlling valve and said conduit and having a diaphragm exposed to the secondary fluid and arranged to be operated by the pressure of said secondary fluid to release said pressure fluid from said control valve and said cylinder.

6. An intermittent control device for controlling the flow of a secondary fluid including, a conduit for the secondary fluid being controlled, a pressure fluid supply inlet, a pressure fluid reservoir for supplying pressure fluid, a pressure fluid accumulating chamber, a conductor connecting said reservoir with said chamber for conducting the pressure fluid from said inlet to said chamber, a metering device for controlling the flow of pressure fluid through said conductor, a cylinder having an air vent and an inlet opening therein, a pressure fluid operated plunger slidable within said cylinder and operated by the pressure fluid from said accumulating chamber, means in said conduit for admitting pressure fluid into said conduit, a control member connected to and operated by said plunger for controlling said pressure fluid admitting means to control the flow of said secondary fluid, a valve connected with said accumulating chamber and said cylinder for controlling the supply of pressure fluid to said cylinder through said inlet opening, said valve being so arranged as to be actuated by a predetermined pressure of fluid within said chamber, means for controlling the operation of said valve and thereby the plunger operation, a fluid cushioning chamber connected with said control valve and said cylinder to cushion the flow of pressure fluid to said cylinder, whereby the operation of said plunger is smooth and relatively slow, a cut-off valve operated by pressure fluid from said cushioning chamber for controlling the supply of pressure fluid from said reservoir to said metering device, and a release valve connected with said controlling valve and said conduit and having a diaphragm exposed to the secondary fluid and arranged to be operated by the pressure of said secondary fluid to release said pressure fluid from said control valve and said cylinder.

7. An intermittent control device for controlling the flow of a secondary fluid including, a conduit for the secondary fluid being controlled, a pressure fluid supply inlet, a pressure fluid reservoir for supplying pressure fluid, a pressure fluid accumulating chamber, a conductor connecting said reservoir with said chamber for conducting the pressure fluid from said inlet to said chamber, valve means for controlling the flow of pressure fluid through said conductor, a cylinder having an air vent and an inlet opening therein, a pressure fluid operated plunger slidable within said cylinder and operated by the pressure fluid from said accumulating chamber, means in said conduit for admitting pressure fluid into said conduit, a control member connected to and operated by said plunger for controlling said pressure fluid admitting means to control the flow of said secondary fluid, a valve connected with said accumulating chamber and said cylinder for controlling the supply of pressure fluid to said cylinder through said inlet opening, said valve being so arranged as to be actuated by a predetermined pressure of fluid within said chamber, means for controlling the operation of said valve and thereby the plunger operation, a cut-off valve for controlling the supply of pressure fluid from said reservoir to said valve means, a release valve connected with said controlling valve and said conduit and having a diaphragm exposed to the secondary fluid and arranged to be operated by the pressure of said secondary fluid to release said pressure fluid from said control valve and said cylinder, and time controlled means for controlling the operation of said valve means.

8. An intermittent control device for controlling the flow of a secondary fluid including, a conduit for the secondary fluid being controlled, a pressure fluid supply inlet, a pressure fluid reservoir for supplying pressure fluid, a pressure fluid accumulating chamber, a conductor connecting said reservoir with said chamber for conducting the pressure fluid from said inlet to said chamber, valve means for controlling the flow of pressure fluid through said conductor, a cylinder having an air vent and an inlet opening therein, a pressure fluid operated plunger slidable within said cylinder and operated by the pressure fluid from said accumulating chamber, means in said conduit for admitting pressure fluid into said conduit, a control member connected to and operated by said plunger for controlling said pressure fluid admitting means to control the flow of said secondary fluid, a valve connected with said accumulating chamber and said cylinder for controlling the supply of pressure fluid to said cylinder through said inlet opening, said valve being so arranged as to be actuated by a predetermined pressure of fluid within said chamber, means for controlling the operation of said valve and thereby the plunger operation, a fluid cushioning chamber connected with said control valve and said cylinder to cushion the flow of pressure fluid to said cylinder, whereby the operation of said plunger is smooth and relatively slow, a cut-off valve for controlling the supply of pressure fluid from said reservoir to said means, a release valve connected with said controlling valve and said conduit and having a diaphragm exposed to the secondary fluid and arranged to be operated by the pressure of said secondary fluid to release said pressure fluid from said control valve and said cylinder, and time controlled means for controlling the operation of said valve means.

9. An intermittent control device for controlling the flow of a secondary fluid including, a conduit for the secondary fluid being controlled, a pressure fluid supply inlet, a pressure fluid reservoir for supplying pressure fluid, a pressure fluid accumulating chamber, a conductor connecting said reservoir with said chamber for conducting the pressure fluid from said inlet to said chamber, valve means for controlling the flow of pressure fluid through said conductor, a cylinder having an air vent and an inlet opening therein, a pressure fluid operated plunger slidable within said cylinder and operated by the pressure fluid from said accumulating chamber, means in said conduit for admitting pressure fluid into said conduit, a control member connected to and operated by said plunger for controlling said pressure fluid admitting means to control the flow of said secondary fluid, a valve connected with said accumulating chamber and said cylinder for controlling the supply of pressure fluid to said cylinder through said inlet opening, said valve being so arranged as to be actuated by a predetermined pressure of fluid within said chamber, a fluid cushioning chamber connected with said control valve and said cylinder to cushion the flow of pressure fluid to said cylinder, whereby the operation of said plunger is smooth and relatively slow, means for controlling the operation of said valve and thereby the plunger operation, a cut-off valve for controlling the supply of pressure fluid from said reservoir to said valve means, means whereby said cut-off valve is actuated by the pressure fluid released from said accumulating chamber by said control valve connected to said chamber, whereby the supply of pressure fluid to said valve means is cut off in advance of the closing of said valve means, and a release valve connected with said controlling valve and said conduit and having a diaphhragm exposed to the secondary fluid and arranged to be operated by the pressure of said secondary fluid to release said pressure fluid from said control valve and said cylinder.

10. An intermittent control device for controlling the flow of a secondary fluid including, a conduit for the secondary fluid being controlled, a pressure fluid supply inlet, a pressure fluid reservoir for supplying pressure fluid, a pressure fluid accumulating chamber, a conductor connecting said reservoir with said chamber for conducting the pressure fluid from said inlet to said chamber, valve means for controlling the flow of pressure fluid through said conductor, a cylinder having an air vent and an inlet opening therein, a pressure fluid operated plunger slidable within said cylinder and operated by the pressure fluid from said accumulating chamber, means in said conduit for admitting pressure fluid into said conduit a control member connected to and operated by said plunger for controlling said pressure fluid admitting means to control the flow of said secondary fluid, a valve connected with said accumulating chamber and said cylinder for controlling the supply of pressure fluid to said cylinder through said inlet opening, said valve being so arranged as to be actuated by a predetermined pressure of fluid within said chamber, a fluid cushioning chamber connected with said control valve and said cylinder to cushion the flow of pressure fluid to said cylinder, whereby the operation of said plunger is smooth and relatively slow, means for controlling the operation of said valve and thereby the plunger operation, a cut-off valve for controlling the supply of pressure fluid from said reservoir to said valve means, means whereby said cut-off valve is actuated by the pressure fluid released from said accumulating chamber by said control valve connected to said chamber, whereby the supply of pressure fluid to said valve means is cut off in advance of the closing of said valve means, a release valve connected with said controlling valve and said conduit and having a diaphragm exposed to the secondary fluid and arranged to be operated by the pressure of said secondary fluid to release said pressure fluid from said control valve and said cylinder, and time controlled means for controlling the operation of said valve means.

11. An intermittent control device for controlling the flow of a secondary fluid including, a conduit for the secondary fluid being controlled, a pressure fluid supply inlet, a pressure fluid reservoir for supplying pressure fluid, a pressure fluid accumulating chamber, a conductor connecting said reservoir with said chamber for conducting the pressure fluid from said inlet to said chamber, valve means for controlling the flow of pressure fluid through said conductor, a cylinder having an air vent and an inlet opening therein, a pressure fluid operated plunger slidable within said cylinder and operated by the pressure fluid from said accumulating chamber, means in said conduit for admitting pressure fluid into said conduit, a control member connected to and operated by said plunger for controlling said pressure fluid admitting means to control the flow of said secondary fluid, a valve connected with said accumulating chamber and said cylinder for controlling the supply of pressure fluid to said cylinder through said inlet opening, said valve being so arranged as to be actuated by a predetermined pressure of fluid within said chamber, means for controlling the operation of said valve and thereby the plunger operation, a cut-off valve for controlling the supply of pressure fluid from said reservoir to said valve means, means whereby said cut-off valve is actuated by the pressure fluid released from said accumulating chamber by said control valve connected to said chamber, whereby the supply of pressure fluid to said valve means is cut off in advance of the closing of said valve means, a release valve connected with said controlling valve and said conduit and having a diaphragm exposed to the secondary fluid and arranged to be operated by the pressure of said secondary fluid to release said pressure fluid from said control valve and said cylinder, and time controlled means for controlling the operation of said valve means.

12. An intermittent control device for controlling the flow of a secondary fluid including, a conduit for the secondary fluid being controlled, a pressure fluid supply inlet, a pressure fluid reservoir for supplying pressure fluid, a pressure fluid accumulating chamber, a conductor connecting said reservoir with said chamber for conducting the pressure fluid from said inlet to said chamber, valve means for controlling the flow of pressure fluid through said conductor, a cylinder having an air vent and an inlet opening therein, a pressure fluid operated plunger slidable within said cylinder and operated by the pressure fluid from said accumulating chamber, means in said conduit for admitting pressure fluid into the conduit, a control member connected to and operated by said plunger for controlling said pressure fluid admitting means to control the flow of said secondary fluid, a valve connected with said accumulating chamber and said cylinder for controlling the supply of pressure fluid to said cylinder through said inlet opening, said valve being so arranged as to be actuated by a predetermined pressure of fluid within said chamber, means for controlling the operation of said valve within predetermined limits, a release valve connected with said controlling valve and said conduit and having a diaphragm exposed to the secondary fluid and arranged to be operated by the pressure of said secondary fluid to release said pressure fluid from said control valve and said cylinder, and time controlled means for controlling the operation of said valve means.

13. A control unit for a pressure fluid flowing apparatus for controlling the flow of a secondary fluid including, a conduit for the secondary fluid being controlled, a pressure fluid supply inlet, a pressure fluid accumulating chamber, a conductor connecting said inlet with said chamber for conducting the pressure fluid from said inlet to said chamber, time controlled means for controlling the flow of pressure fluid through said conductor, pressure fluid responsive means for reducing said pressure fluid in said chamber when a predetermined pressure has accumulated in said chamber, an actuator connected to said responsive means and operated by the pressure fluid released from said chamber, means in said conduit for admitting pressure fluid into said conduit, a control member connected to said actuator for controlling said pressure fluid admitting means to control the flow of said secondary fluid and operated by said actuator, and means including an element exposed to said secondary fluid arranged to be operated by the pressure of said flowing secondary fluid for releasing the pressure fluid from said actuator.

14. A control unit for a pressure fluid flowing apparatus for controlling the flow of a secondary fluid including, a conduit for the fluid being controlled, a pressure fluid supply inlet, a pressure fluid accumulating chamber, a conductor connecting said inlet with said chamber for conducting the pressure fluid from said inlet to said chamber, time controlled means for controlling the flow of presssure fluid through said conductor, pressure fluid responsive means for reducing said presssure fluid in said chamber when a predetermined pressure has accumulated in said chamber, an actuator connected to said responsive means and operated by the pressure fluid released from said chamber, means in said conduit for admitting pressure fluid into said conduit, a control member connected to said actuator for controlling said pressure fluid admitting means to control the flow of said secondary fluid and operated by said actuator, means including an element exposed to said secondary fluid arranged to be operated by the pressure of said flowing secondary fluid for releasing the pressure fluid from said actuator, and cushioning means connected to said pressure responsive means and said actuator so when said responsive means is actuated the flow of pressure fluid from said chamber is cushioned so that the operation of said actuator is smooth and steady.

15. An intermittent control device for controlling the flow of an extraneous fluid including, a flow conduit for the fluid being controlled, a pressure fluid supply inlet, a pressure fluid accumulating chamber, means for feeding pressure fluid from said inlet to said chamber, pressure fluid actuated means connected to said chamber and actuated by the pressure fluid accumulated in said chamber, time controlled means for controlling the feed of pressure fluid to said chamber to control the frequency of operation of said pressure actuated means, a valve in said actuated means for controlling the supply of pressure fluid from said chamber to said actuated means, means in said conduit for admitting pressure fluid into said conduit, controlling means having a connection with said actuated means and operated by the pressure fluid released from said chamber by said actuated means for controlling said pressure fluid admitting means to control the flow of said extraneous fluid through said conduit, cushioning means connected to said pressure actuated means and said controlling means so that when pressure actuated means is actuated the flow of said pressure fluid from said chamber is cushioned and the operation of said actuator is smooth and steady, and means arranged to be operated by the flow of said extraneous fluid in said conduit for releasing said pressure fluid from said control means and said pressure actuated means.

16. An intermittent control device for controlling the flow of an extraneous fluid including, a conduit for said extraneous fluid, a pressure fluid supply inlet, a pressure fluid accumulating chamber for receiving pressure fluid from said fluid inlet, means for feeding pressure fluid from said inlet to said chamber, a spring-loaded valve connected to said chamber and actuated by the pressure fluid accumulated in said chamber, a cylinder connected to said valve, a pressure fluid operated plunger in said cylinder and actuated by said pressure fluid released from said chamber by said valve, valve means connected to said feeding means for controlling the feed of pressure fluid to said chamber to control the frequency of operation of said valve and said plunger, means in said conduit for admitting pressure fluid into the conduit, a control member in said conduit connected to said plunger and actuated thereby for controlling said pressure fluid admitting means to control the flow of said extraneous fluid in said conduit, means actuated by said extraneous fluid for releasing said pressure fluid from said valve and said cylinder when said extraneous fluid is flowing, and time controlled means for controlling the operation of said valve means.

17. An intermittent control device for controlling the flow of an extraneous fluid including, a conduit for said extraneous fluid, a pressure fluid supply inlet, a pressure fluid accumulating chamber for receiving pressure fluid from said fluid inlet, means for feeding pressure fluid from said inlet to said chamber, a spring-loaded valve connected to said chamber and actuated by the pressure fluid accumulated in said chamber, a cylinder connected to said valve, a pressure fluid operated plunger in said cylinder and actuated by said pressure fluid released from said chamber by said valve, valve means connected to said feeding means for controlling the feed of pressure fluid to said chamber to control the frequency of operation of said valve and said plunger, means in said conduit for admitting pressure fluid into the conduit, a control member connected to said plunger and actuated thereby for controlling said pressure fluid admitting means to control the flow of said extraneous fluid in said conduit, means for controlling the operation of said valve within predetermined limits, means actuated by said extraneous fluid for releasing said pressure fluid from said valve and said cylinder when said extraneous fluid is flowing in said conduit, and time controlled means for controlling the operation of said valve means.

18. An intermitten control device for controlling the flow of an extraneous fluid including, a conduit for said extraneous fluid, a pressure fluid supply inlet, a pressure fluid accumulating chamber for receiving pressure fluid from said fluid inlet, means for feeding pressure fluid from said inlet to said chamber, a spring-loaded valve connected to said chamber and actuated by the pressure fluid accumulated in said chamber, a cylinder connected to said valve, a pressure fluid operated plunger in said cylinder and actuated by said pressure fluid released from said chamber by said valve, valve means connected to said feeding means for controlling the feed of pressure fluid to said chamber to control the frequency of operation of said valve and said plunger, means in said conduit for admitting prssure fluid into the conduit, a control member connected to said plunger and actuated thereby for controlling said pressure fluid admitting means to control the flow of said extraneous fluid, means actuated by the flow of said extraneous fluid for releasing said pressure fluid from said valve and said cylinder when said extraneous fluid is flowing in said conduit, fluid cushioning means connected to said cylinder and said valve so when said valve is actuated by said pressure fluid in said chamber the flow of said pressure fluid from said valve is cushioned so that the operation of said plunger is smooth and steady, and time controlled means for controlling the operation of said valve means.

19. An intermittent control device for controlling the flow of an extraneous fluid including, a conduit for said extraneous fluid, a pressure fluid supply inlet, a pressure fluid accumulating chamber for receiving pressure fluid from said fluid inlet, means for feeding pressure fluid from said inlet to said chamber, a spring-loaded valve connected to said chamber and actuated by the pressure fluid accumulated in said chamber, a cylinder connected to said valve, a pressure fluid operated plunger in said cylinder and actuated by said pressure fluid released from said chamber by said valve, valve means connected to said feeding means for controlling the feed of pressure fluid to said chamber to control the frequency of operation of said valve and said plunger, means in said conduit for admitting pressure fluid into the conduit, a control member connected to said plunger and actuated thereby for controlling said pressure fluid admitting means to control the flow of said extraneous fluid, means for releasing said pressure fluid from said valve and said cylinder when said extraneous fluid is flowing comprising a diaphragm valve connected with said control valve and said cylinder and arranged to be operated when exposed to a predetermined pressure of said extraneous fluid, and time controlled means for controlling the operation of said valve means.

20. An intermittent control device for controlling the flow of an extraneous fluid including, a conduit for said extraneous fluid, a pressure fluid supply inlet, a pressure fluid accumulating chamber for receiving pressure fluid from said fluid inlet, means for feeding pressure fluid from said inlet to said chamber, a spring-loaded valve connected to said chamber and actuated by the pressure fluid accumulated in said chamber, a cylinder connected to said valve, a pressure fluid operated plunger in said cylinder and actuated by said pressure fluid released from said chamber by said valve, valve means connected to said feeding means for controlling the feed of pressure fluid to said chamber to control the frequency of operation of said valve and said plunger, means in said conduit for admitting pressure fluid into the conduit, a control member connected to said plunger and actuated thereby for controlling said pressure fluid admitting means to control the flow of said extraneous fluid, means for releasing said pressure fluid from said valve and said cylinder when said extraneous fluid is flowing comprising a diaphragm valve connected with said control valve and said cylinder and arranged to be operated when exposed to a predetermined pressure of said extraneous fluid, fluid cushioning means connected to said cylinder and said valve so that when said valve is actuated by said pressure fluid in said chamber the flow of said pressure fluid from said valve is cushioned so that the operation of said plunger is smooth and steady, and time controlled means for controlling the operation of said valve means.

21. An intermittent control device for controlling the flow of a secondary fluid including, a flow conduit for said secondary fluid, a pressure fluid reservoir for supplying pressure fluid, a pressure fluid accumulating chamber for receiving pressure fluid, a flow pipe connecting said chamber with said reservoir, valve means connected in said pipe for controlling the flow of pressure fluid through said pipe to control the accumulation of pressure fluid in said chamber, a spring-loaded valve connected to said chamber for receiving pressure fluid from said chamber and arranged to be actuated by the pressure fluid accumulated in said chamber, a cylinder connected to said valve, a pressure fluid operated plunger slidable in said cylinder and actuated by said pressure fluid released from the chamber by said valve, a cushioning chamber connected to said valve and said cylinder for receving a portion of the flow of pressure fluid from said valve so that the operation of said plunger in said cylinder will be smooth and relatively slow, means in said conduit for admitting pressure fluid into the conduit, a control member in said conductor connected to said plunger and actuated thereby for controlling the admittance of pressure fluid to said conduit to control the flow of said secondary fluid through said conduit, means including an element exposed to and arranged to be operated by the flowing of said secondary fluid for releasing said pressure fluid from said cylinder to permit said plunger to return to its normal position, and time controlled means for controlling the operation of said valve means.

22. A system of controlling the flow of an extraneous fluid which includes, a flow conduit for said extraneous fluid, a flow pipe for supplying a fluid under pressure, time controlled means connected in said pipe for controlling the flow of said pressure fluid through said pipe, means for accumulating said pressure fluid from said pipe, means connected to said accumulating means and intermittently actuated by the pressure of said accumulated pressure fluid for reducing the pressure of said pressure fluid in said accumulating means, pressure fluid actuated means connected to said reducing means and operated by the pressure fluid released from said accumulating means, means in said conduit for admitting pressure fluid into the conduit, a control member connected to said pressure fluid actuated means and operated thereby for controlling said pressure fluid admitting means to control the flow of the extraneous fluid, and means for releasing the pressure fluid from said actuated means, said release means being operated by the flow of said extraneous fluid.

23. A system of controlling the lifting of well fluid which includes, a well, a flow line in said well, a flow conductor for supplying a pressure fluid to said well, a flow conduit connected to said conductor, time controlled means connected in said conduit for controlling the flow of said pressure fluid through said conduit, means for accumulating said pressure fluid from said conduit, means connected to said accumulating means and intermittently actuated by the pressure of said accumulated pressure fluid for reducing the pressure of said pressure fluid in said accumulating means, pressure fluid actuated means connected to said reducing means and operated by the pressure fluid released from said accumulating means, means in said flow line for admitting pressure fluid into said flow line, control means in said flow line connected to said pressure fluid actuated means and operated thereby for controlling said pressure fluid admitting means to control the admission of pressure fluid in said well to said flow line, and means for releasing the pressure fluid from said actuated means, said means being operated by the flow of said well fluid in said flow line.

24. A system of controlling the lifting of well fluid which includes, a well, a flow line in said well for providing a column of well fluid, means for supplying a pressure fluid to said well, means for controlling the admission of pressure fluid to said column of well fluid, a flow conduit connected to said supply means for by-passing a portion of said pressure fluid, time controlled means connected in said conduit for controlling the flow of said pressure fluid through said conduit, means for accumulating said pressure fluid from said conduit, means connected to said accumulating means and intermittently operated by the pressure of said accumulated pressure fluid for reducing the pressure of said pressure fluid in said accumulating means to set up a pressure differential for a predetermined period of time to actuate said pressure fluid admission controlling means for said column of well fluid to flow said well fluid, and means connected to said flow line and actuated by the pressure of the flowing well fluid for releasing the pressure fluid from said reducing means, whereby to cut off the admission of said pressure fluid to said column of well fluid.

25. A system of controlling the lifting of well fluid which includes, a well, a flow line in said well for providing a column of well fluid, means for supplying a pressure fluid to said well, means for controlling the admission of pressure fluid to said column of well fluid, a flow conduit connected to said supply means for by-passing a portion of said pressure fluid, time controlled means connected in said conduit for controlling the flow of said pressure fluid through said conduit, means for accumulating said pressure fluid from said conduit, means connected to said accumulating means and intermittently operated by the pressure of said accumulated pressure fluid for reducing the pressure of said pressure fluid in said accumulating means to set up a pressure differential for a predetermined period of time to actuate said pressure fluid admission controlling means for said column of well fluid to flow said well fluid, means connected to said flow line and actuated by the pressure of the flowing well fluid for releasing the pressure fluid from said reducing means, whereby to cut off the admission of said pressure fluid to said column of well fluid, and cushioning means connected to said accumulating means and said pressure fluid admission actuating means so that when said reducing means is actuated by the pressure fluid in said accumulating means the flow of said pressure fluid therefrom is cushioned so that the operation of said admission controlling means is smooth and relatively slow.

JEDDY D. NIXON.